(12) United States Patent
Sato (10) Patent No.: US 6,499,845 B2
(45) Date of Patent: Dec. 31, 2002

(54) OPTICAL APPARATUS AND PROJECTION TYPE DISPLAY APPARATUS USING THE SAME

(75) Inventor: Yoshihisa Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/814,282

(22) Filed: Mar. 21, 2001

(65) Prior Publication Data

US 2001/0038440 A1 Nov. 8, 2001

(30) Foreign Application Priority Data

Mar. 23, 2000 (JP) ........................................ 2000-087115

(51) Int. Cl.⁷ ............................................. F21V 14/00
(52) U.S. Cl. ........................ 353/38; 362/268; 362/255; 355/122
(58) Field of Search ......................... 313/499; 362/255, 362/268, 416, 310; 353/38

(56) References Cited

U.S. PATENT DOCUMENTS

| 3,821,590 | A | | 6/1974 | Kosman et al. | |
|---|---|---|---|---|---|
| 4,448,504 | A | | 5/1984 | Altman | |
| 5,343,330 | A | * | 8/1994 | Hoffman et al. | ............. 359/708 |
| 5,662,401 | A | | 9/1997 | Shimizu et al. | |
| 5,957,570 | A | * | 9/1999 | Ooyama et al. | ............. 313/113 |
| 6,036,318 | A | * | 3/2000 | Itoh | ............................. 353/20 |
| 6,246,526 | B1 | * | 6/2001 | Okuyama | ........................ 349/5 |

FOREIGN PATENT DOCUMENTS

| EP | 0 683 425 | 11/1995 |
|---|---|---|
| EP | 0 740 169 | 10/1996 |

* cited by examiner

*Primary Examiner*—Russell Adams
*Assistant Examiner*—D. Ben Esplin
(74) *Attorney, Agent, or Firm*—Frommer Lawrence & Haug LLP; William S. Frommer; Leonard J. Santisi (57) ABSTRACT

An optical projection type display apparatus wherein the first MLA forming the integrator optical system is arranged integrally at the light emitting part of the reflecting and condensing mirror so as to function as a surface plate so that the distance between the effective reflecting part of the reflecting and condensing mirror and the first MLA can be shortened. In addition, being formed integral to function as a surface plate of the reflecting and condensing mirror, the number of optical elements is reduced by one.

14 Claims, 10 Drawing Sheets

TOTAL LENGTH L

OPTICAL APPARATUS AND PROJECTION TYPE DISPLAY APPARATUS USING THE SAME

BACKGROUND OF THE INVENTION

1. Field of the Invention

The present invention relates to an optical apparatus used as an illuminating apparatus for a display apparatus such as a liquid crystal projector and to a projection type display apparatus using the optical apparatus.

2. Description of the Related Art

A projector apparatus utilizing a spatial light modulator (hereinafter abbreviated as SL2) such as a liquid crystal panel or a DMD of Texas Instruments of the U.S. is suitable for reducing size.

Below, an optical system of a projector making use of an SLM will be, explained.

Figure 1:
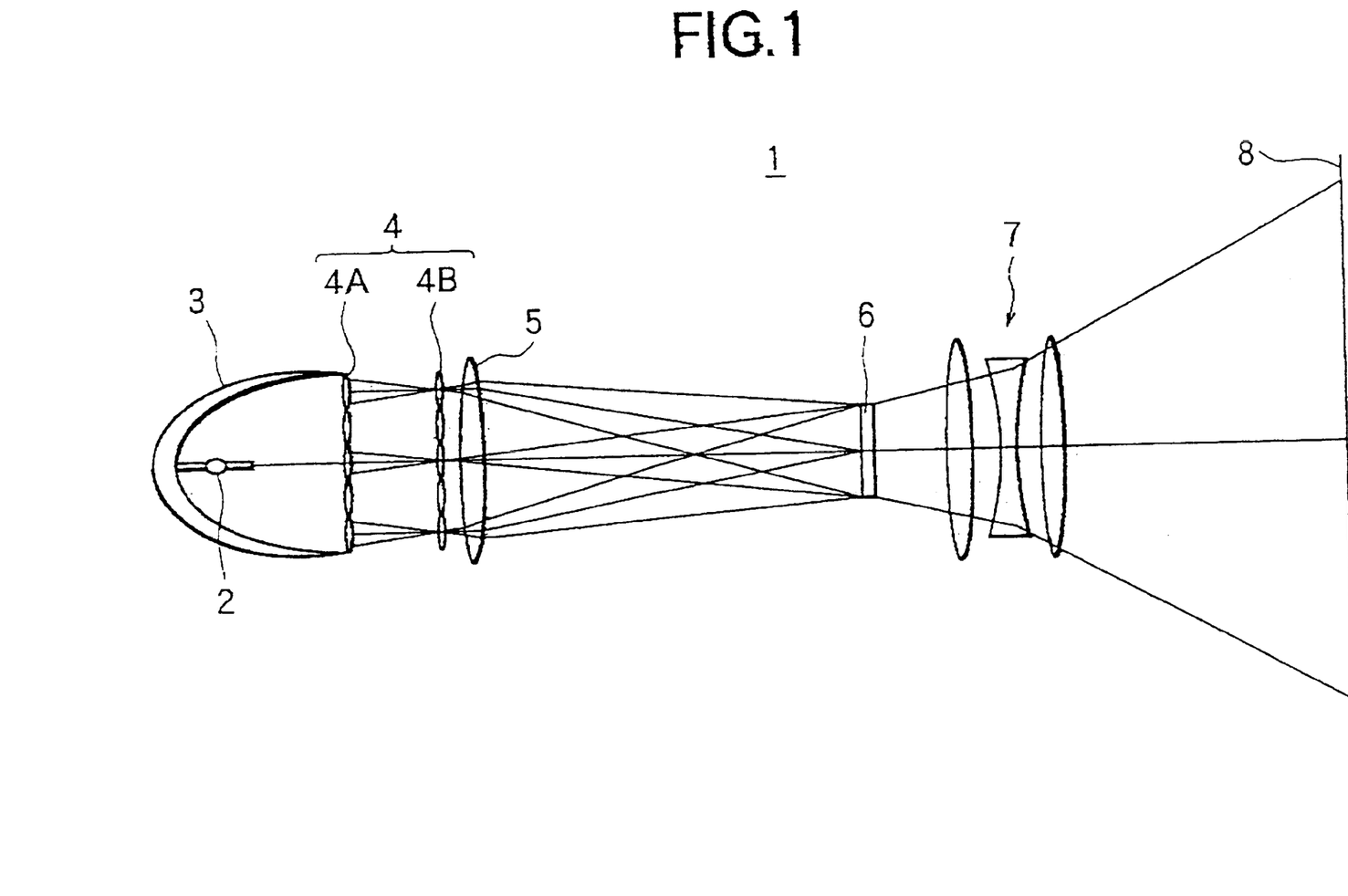
FIG. 1 is a view of an example of the configuration of an optical system in a projector using an SLM.

FIG. 1 is a view of an example of the configuration of an optical system in a projector using an SLM.

The projector 1, as shown in FIG. 1, comprises a light source 2, a reflecting and condensing mirror 3, an integrator optical system 4, a condenser lens 5, an SLM 6, and a projecting lens 7 as main components.

In a projector using an SLM, since the SLM itself does not emit light, a separate light source is necessary. A discharge lamp is often used as the light source 2 from the viewpoint of the luminous efficiency etc.

The reflecting and condensing mirror 3 condenses light beams from the light source 2, that is, a discharge lamp, and emits the result in approximately the same direction.

The integrator optical system 4 spatially equally illuminates the SLM 6, that is, spatially uniformly distributes the light emitted from the reflecting and condensing mirror 3 in order to illuminate the SLM 6 with a uniform distribution of luminous intensity.

The reason of realizing this uniform illumination is for achieving a high quality image.

Figure 2:
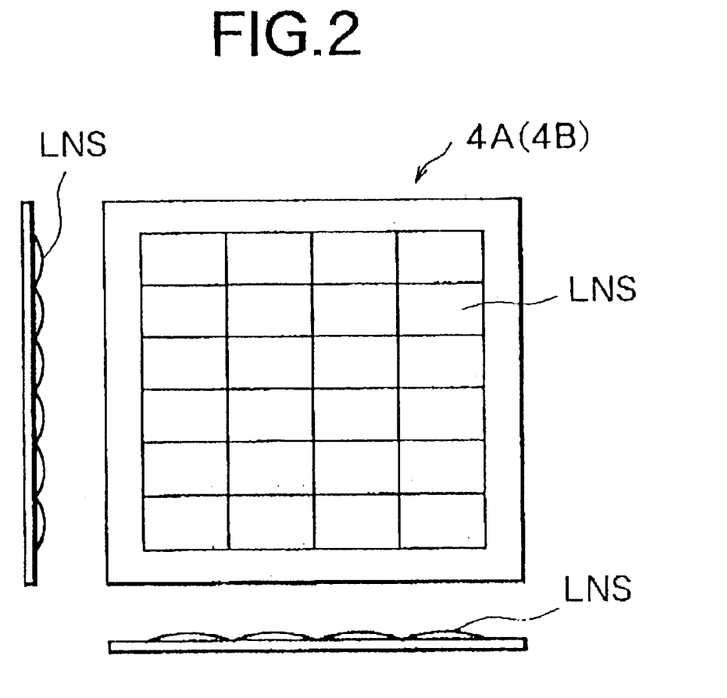

The integrator optical system 4, as shown in FIG. 2, is comprised of a first multi-lens array (MLA) 4A and a second multi-lens array 4B both of which include a plurality of lens LNS arranged in an array.

The first MLA 4A divides the light emitted from the reflecting and condensing mirror 3 into a plurality of images and lays out their images of the light source in the vicinity of light incident plane of the second MLA 4B.

The second MLA 4B guides the images of light source divided by the first MLA 4A to the condenser lens 5 so that they can be incident as the illuminating light of the SLM 6.

In a projector having an optical system of such a configuration, the light emitted from the light source 2 is condensed by the reflecting and condensing mirror 3 having a reflecting surface of a parabolic shape, becomes nearly parallel light, and is incident on the first MLA 4A.

The light incident on the first MLA 4A is incident on the second MLA 4B arranged in the proximity of the focal distances of the lenses LNS of the first MLA 4A.

The light emitted from the second MLA 4B is condensed by the condenser lens 5 so that the images of the lenses of the first MLA 4A are superposed and is incident on the SLM 6 as illuminating light.

By superposing the images of the lenses of the first MLA 4A, even if the light incident on the first MLA 4A is not spatially uniform, the condensed image becomes spatially uniform.

In addition, a video signal is applied to the SLM 6. At the SLM 6, the incident light is spatially modulated and emitted in accordance with the applied video signal. For example, if the SLM is a liquid crystal panel, the intensity modulation is carried out by using deflection. If a DMD is used, the intensity modulation is carried out by changing the angle of emission of the emitted light (deflection).

The light emitted from the SLM 6 passes through the projecting lens 7 and is projected on the screen 8. An image of the SLM 6 is projected on the screen 8 by the projecting lens 7, whereby the video signal applied to the SLM 6 is displayed.

Summarizing the problem to be solved by the invention, reducing the size of an apparatus is important from the point of view of reducing weight, the amount of material, and so on.

To reduce the size of a projector using an SLM, for example reduction of the size of the SLM panel may be mentioned. This results in reduced size of the optical system, reduced size of the projecting lens, etc. Many optical elements forming an optical system can be made smaller.

The discharge lamp that forms the light source 2, however, cannot be made small easily. The reasons are as follows.

That is, a discharge lamp has a high pressure gas sealed in its interior. Further, its temperature is elevated in order for emitting light. Due to this, considering safety when the lamp is broken, it is necessary to give the lamp sufficient strength. Therefore it cannot be made small easily.

Figure 3:
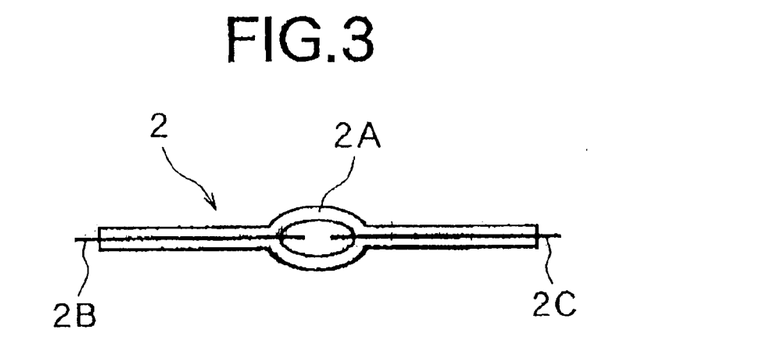
FIG. 3 is a schematic view of a discharge lamp.

FIG. 3 is a schematic view of a discharge lamp that forms a light source 2.

A high pressure gas is sealed in the interior of the glass 2A at the center of the lamp. Electrodes 2B and 2C stick out from the portion sealing the high pressure gas. Light is emitted by passing a current through the electrodes 2B and 2C.

Figure 4:
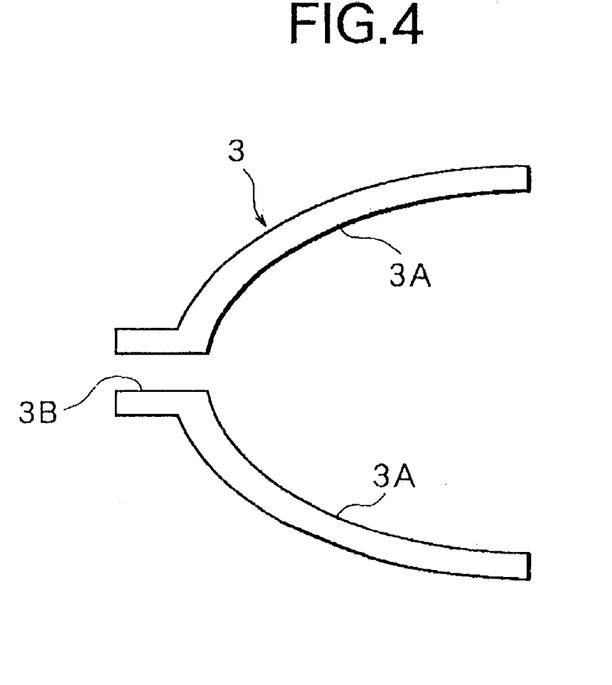
FIG. 4 is a schematic view of a reflecting and condensing mirror.

In addition, FIG. 4 is a schematic view of the reflecting and condensing mirror 3.

As shown in FIG. 4, the reflecting surface 3 of the reflecting and condensing mirror 3 is shaped as a parabolic surface. A mount 3B for plugging in the discharge lamp is formed at its approximate center.

Figure 5:
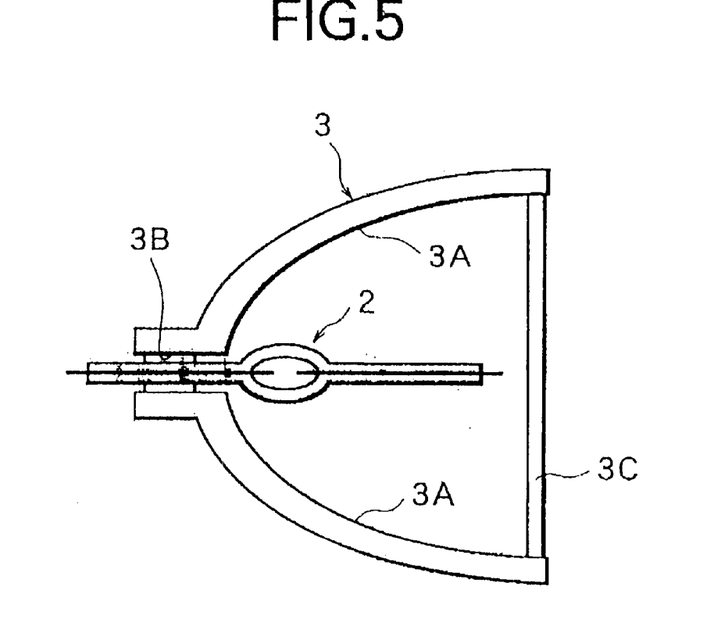
FIG. 5 is a view of the configuration of a light source after a discharge lamp is mounted at a reflecting and condensing mirror.

The discharge lamp is mounted to such a reflecting and condensing mirror 3 as shown in FIG. 5.

To facilitate change of the discharge lamp, or considering safety when the discharge lamp is broken, the discharge lamp is integrated with the reflecting and condensing mirror 3 by the insertion mount 3B. Further, a surface plate 3C being a plane plate just for passing light is provided at the plane from which the light leaves the reflecting and condensing mirror 3 so as to prevent pieces of glass from flying out from the reflecting and condensing mirror 3 when the discharge lamp is broken.

As described above, since the discharge lamp cannot be made small, the reflecting and condensing mirror 3 has to be large.

Figure 6:
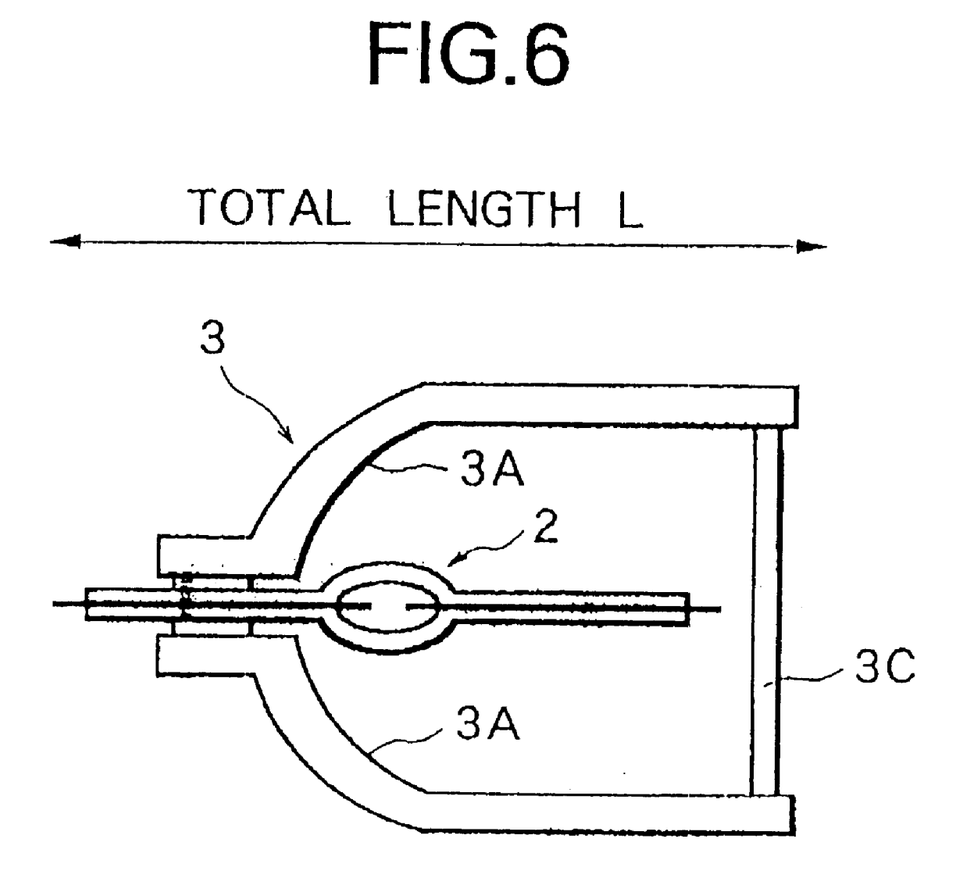
FIG. 6 is a view for explaining that even if the effective cross sectional area of a condensing and reflecting mirror is small, the overall length of the reflecting mirror does not become short.

For example, as shown in FIG. 6, even if the cross-section of the light emitted from the reflecting and condensing mirror 3 is small, the total length of the discharge lamp does not change, so the total length of the reflecting and condensing mirror 3 does not become shorter.

In this way, because the discharge lamp 2 and the reflecting and condensing mirror 3 cannot be made small and because the integrator optical system 4 is arranged on the outgoing optical path of the light from the reflecting and condensing mirror 3 and at a position apart from the discharge lamp 2 and the surface plate 3 before that, the optical path of the illuminating light coming from the discharge lamp 2 through the reflecting and condensing mirror 3 becomes longer, the illumination optical apparatus becomes large, and consequently there is a problem that reduction of size of the projector is difficult.

SUMMARY OF THE INVENTION

The present invention was made in consideration of the above situation and has as an object to provide an optical system able to realize reduced size and a projection type display apparatus using the same. to a first aspect of the present According to a first aspect of the present invention, there is provided the optical apparatus comprising a light source, a reflecting and condensing mirror for reflecting and condensing a light beam from the light source, guiding the light beam to substantially the same direction, and emitting the light beam from a light emitting part, a first multi-lens array in which a plurality of lens are arranged, and which divides an incident light into a plurality of images, and lays out the light spots of the divided images at predetermined locations, and a second multi-lens array in which a plurality of lens corresponding to the plurality of light spots condensed by the first multi-lens array are arranged and which is arranged in the proximity of the focal distance of the first multi-lens array, wherein the first multi-lens array is arranged integrally at the light emitting part of the reflecting and condensing mirror so that the light reflected and condensed by the reflecting and condensing mirror is incident as the incident light.

Alternatively, according to a second aspect of the present invention, there is provided the optical apparatus comprising a light source, a reflecting and condensing mirror for reflecting and condensing a light beam from the light source, guiding the light beam to substantially the same direction, and emitting the light beam from a light emitting part, a first multi-lens array in which a plurality of lens are arranged, and which divides an incident light into a plurality of images, and lays out the light spots of the divided images at predetermined locations, and a second multi-lens array in which a plurality of lens corresponding to the plurality of light spots condensed by the first multi-lens array are arranged and which is arranged in the proximity of the focal distance of the first multi-lens array, wherein the first multi-lens array is arranged away from the light emitting part at the side where the light source is arranged away so that the light reflected and condensed by the reflecting and condensing mirror is incident as the incident light.

In the present invention, an aperture is formed in approximately the center portion of the first multi-lens array, and the light source is inserted into the aperture.

In the present invention, a transparent plate passing the light emitted from the first multi-lens array is arranged at the light emitting part of the reflecting and condensing mirror.

In the present invention, the second multi-lens array is arranged integrally at the light emitting part of the reflecting and condensing mirror.

Further, according to a third aspect of the present invention, there is provided a projection type display apparatus comprising a modulating means for modulating and emitting a light emitted from an optical apparatus based on image information and a projection optical system for projecting the light emitted from the modulating means on a screen, the optical apparatus comprising at least a light source, a reflecting and condensing mirror for reflecting and condensing a light beam from the light source, guiding the light beam to substantially the same direction, and emitting the light beam from a light emitting part, a first multi-lens array in which a plurality of lens are arranged, and which divides an incident light into a plurality of images, and lays out the light spots of the divided images at predetermined locations, and a second multi-lens array in which a plurality of lens corresponding to the plurality of light spots condensed by the first multi-lens array are arranged and which is arranged in the proximity of the focal distance of the first multi-lens array, wherein the first multi-lens array is arranged integrally at the light emitting part of the reflecting and condensing mirror so that the light reflected and condensed by the reflecting and condensing mirror is incident as the incident light.

Alternatively, according to a fourth aspect of the present invention, there is provided a projection type display apparatus comprising a modulating means for modulating and emitting a light beam emitted from an optical apparatus based on image information and a projection optical system for projecting the light emitted from the modulating means on a screen, the optical apparatus comprising at least a light source, a reflecting and condensing mirror for reflecting and condensing a light beam from the light source, guiding the light beam to substantially the same direction, and emitting the light beam from a light emitting part, a first multi-lens array in which a plurality of lens are arranged, and which divides an incident light into a plurality of images, and lays out the light spots of the divided images at predetermined locations, and a second multi-lens array in which a plurality of lens corresponding to the plurality of light spots condensed by the first multi-lens array are arranged and which is arranged in the proximity of the focal distance of the first multi-lens array, wherein the first multi-lens array is arranged away from the light emitting portion at the side where the light source is arranged away so that the light reflected and condensed by the reflecting and condensing mirror strikes the incident light.

According to the present invention, by integrally arranging the first multi-lens array at the light emitting part of the reflecting and condensing mirror so as to have the functions as a surface plate, the distance between the effective reflecting part of the reflecting and condensing mirror and the first multi-lens array can be shortened.

In addition, since the reflecting and condensing mirror is formed integrally to have the function of a surface plate, the number of optical elements is reduced by one. Therefore, loss of light due to surface reflection occurring on a boundary surface having a difference of the refractive indexes is decreased, and a larger amount of light can be directed to an object to be illuminated.

In addition, according to the present invention, by arranging the first multi-lens array on the inner side of the reflecting and condensing mirror relative to the light emitting part, the optical path length is further shortened.

BRIEF DESCRIPTION OF THE DRAWINGS

These and other objects and features of the present invention will become clearer from the following description of the preferred embodiments given with reference to the accompanying drawings, in which:

FIG. 2 is a view for explaining the configuration of

DESCRIPTION OF THE PREFERRED EMBODIMENTS

Below, preferred embodiments will be described with reference to the accompanying drawings.
First Embodiment FIG. 7 is a view of the configuration of a first embodiment of a projection type display apparatus (projector) using an optical apparatus according to the present invention.

Figure 7:
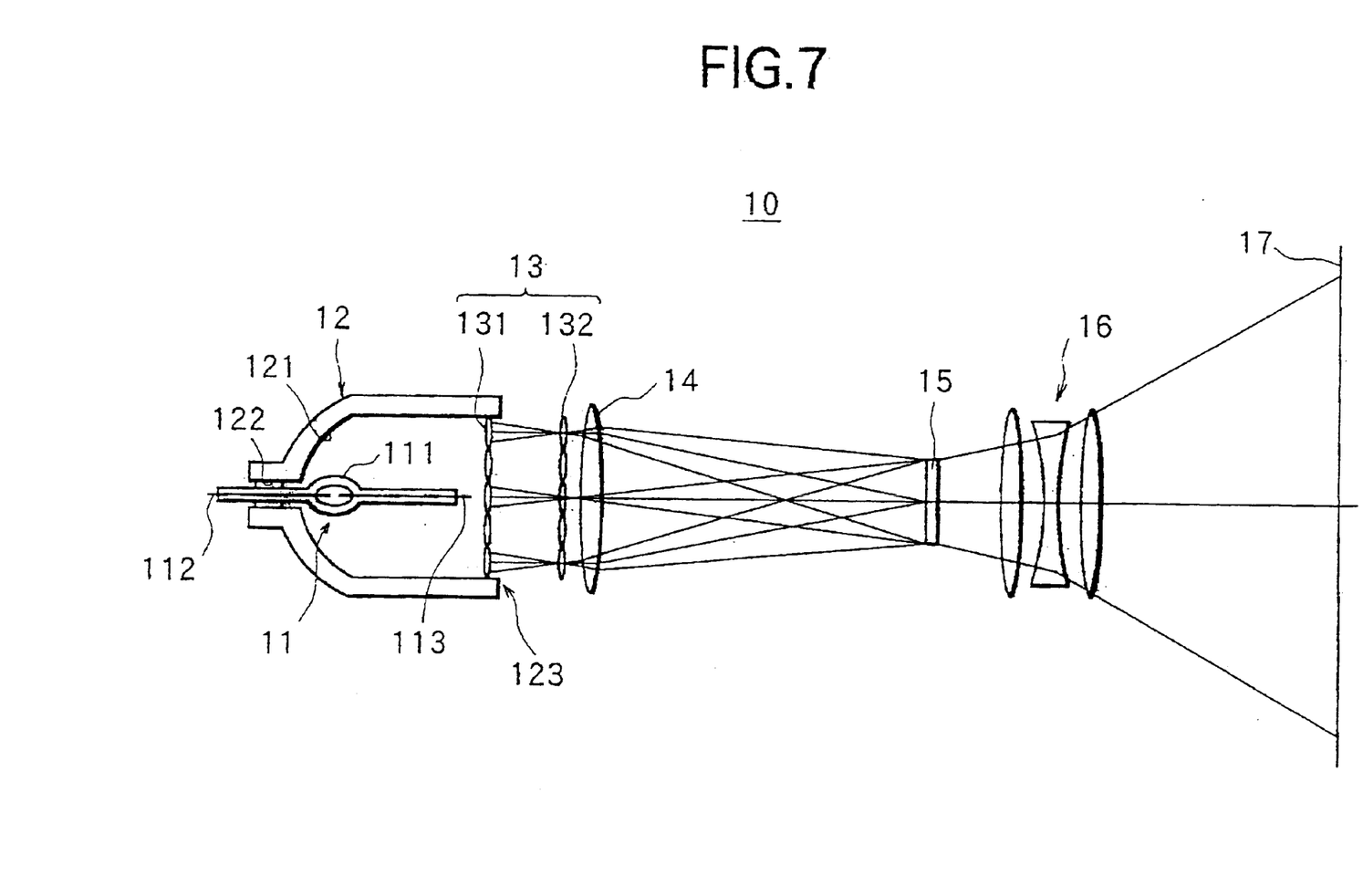
FIG. 7 is a view of the configuration of a first embodiment of a projection display apparatus (projector) using an optical apparatus according to the present invention.

The projector 10, as shown in FIG. 7, comprises a light source 11, a reflecting and condensing mirror 12, an integrator optical system 13, a condenser lens 14, an SLM 15 serving as a modulating means, and a projecting optical system 16 as main components.

An illuminating optical apparatus according to the present invention is formed by the light source 11, the a reflecting and condensing mirror 12, the integrator optical system 13, and the condenser lens 14.

The light source 11 is comprised of a discharge lamp of a specific length using, for example, a halogen lamp or a metal halide lamp. It receives power from a not shown power circuit and emits illumination light.

The discharge lamp forming the light source 11, as shown in FIG. 7, is sealed a high pressure gas in the interior of the glass at the center of the lamp, has electrodes 2B and 2C protruding from the portion sealing the high pressure gas, and emits light by passing a current through the electrodes 2B and 2C.

In the light source 11, an emitting part 111 is formed from the portion sealing the high pressure gas.

The reflecting and condensing mirror 12 reflects and condenses the illumination light emitted from the light source 11 by a reflecting surface formed in a parabolic shape to make it substantially parallel light which is incident the integrator optical system 13.

To emit substantially parallel light from the reflecting and condensing mirror 12, the reflecting mirror has to be a parabolic body of rotation. The emitting part 111 of the light source 11 is placed near the focal position of the parabolic surface (reflecting surface) 121.

The reflecting and condensing mirror 12 is formed with an insertion mount 122 for the discharge lamp near its center. To facilitate change of the discharge lamp, considering safety when the discharge lamp is broken, the discharge lamp is made integral with the reflecting and condensing mirror 12 by the insertion mount 122.

In addition, the reflecting and condensing mirror 12 is formed so that the cross section of the light emitted from the reflecting surface 121 becomes small. The reflecting surface 121 is formed in a parabolic shape up to a specific distance from the discharge lamp. The portion from the edge to the light emitting part 123 is formed so that its cross section becomes nearly a straight line (non-parabolic shape).

Then, instead of a flat plate just for passing light, the first MLA of the integrator optical system 13 is arranged integrally at the light emitting part 123 of the reflecting and condensing mirror 12.

The integrator optical system 13 is comprised of a first MLA (multi-lens array) 131 and a second MLA 132 each provided with a plurality of lens arranged in an array.

The first MLA 131, as shown above, is arranged integrally with the light emitting part 123 of the reflecting and condensing mirror 12. It divides the light emitted from the reflecting and condensing mirror 12 into a plurality of images and lays out their images of the light source in the vicinity of the light incident plane of the second MLA 132.

In addition, by integrally arranging the first MLA 131 at the light emitting part 123 of the reflecting and condensing mirror 12, the first MLA 131 also has the functions of a flat plate that prevents pieces of glass from flying out of the reflecting and condensing mirror 12 when for example the discharge lamp is broken.

The second MLA 132 is arranged near the focal distance of the first MLA 131 on the outgoing optical path on the outgoing side of the reflecting and condensing mirror 12. It guides the images of the light source divided by the first MLA 131 to the condenser lens 14 so that they can be incident as illumination light of the SLM 15.

The condenser lens 14 condenses the illumination light (the light emitted from the second MLA) spatially uniformly distributed by the integrator optical system 13 at the illumination area, that is, the SLM 15.

The SLM 15 spatially modulates and emits the incident light from the condenser lens 14 in accordance with an applied video signal.

For example, if the SLM 15 is a liquid crystal panel, the intensity modulation is carried out by using deflection. If a DMD, the intensity modulation is carried out by changing the emission angle of the emitted light (deflection).

The projection optical system 16 projects the light emitted from the SLM 15 onto a screen 17.

Next, the operation resulting from the above configuration will be explained.

The light emitted from the light source 11 is reflected and condensed by the reflecting surface 121 of the reflecting and condensing mirror 12 having a parabolic reflecting surface to become substantially parallel light which is incident on the first MLA 131 of the integrator optical system 13 arranged integrally at the light emitting part 123.

The light beam incident on the first MLA 131 is incident on the second MLA 132 arranged near the focal distance of the lenses of the first MLA 131 (outside the reflecting and condensing mirror 12). The light emitted from the second MLA 132 is condensed by the condenser lens 14 so that the images of lenses of the first MLA 131 are superposed with respect to the SLM 15, and is incident as illuminating light to the SLM 15.

By superposing the images of lenses of the first MLA 131, even if the light incident on each lenses of the first MLA 131 is not spatially uniform, the condensed image becomes spatially uniform.

Furthermore, in the proximity of the incident side of the SLM 15, there may be provided a convex lens for making the directions of the main light rays of light beams emitted from lenses of the second MLA 132 substantially parallel with the optical axis, causing light beams to be incident on the SLM 15 as in a telocentric optical system.

Further, in the SLM 15, the incident light is spatially modulated and emitted in accordance with the applied video signal.

The light emitted from the SLM 131 passes through the projecting optical system 16 and is projected on the screen 17. The image of the SLM 15 is projected on the screen 17 by the projecting optical system 16, whereby the video signal applied to the SLM 15 is displayed.

As described above, according to the first embodiment of the present invention, since the first MLA 131 forming the integrator optical system 13 is arranged integrally at the light emitting part 123 of the reflecting and condensing mirror 12 so as to function as a surface plate, the distance between the effective reflecting part of the reflecting and condensing mirror 12 and the first MLA 131 can be shortened. Due to this, the optical path of the optical system becomes shorter. Therefore, it becomes possible to make the optical system of the projector smaller.

In addition, since the reflecting and condensing mirror is formed integrally to have the function of a surface plate, the number of optical elements is reduced by one. By reducing the number of parts and suppressing the cost, an economical projector can be realized.

In addition, because loss of light due to surface reflection (Fresnel reflection) occurring on a boundary surface having a difference of the refractive indexes is decreased, so a larger amount of light can be directed to the screen 17 and a projector of a high luminance can be achieved.

Furthermore, if the first MLA 131 is formed to be removable from the condensing and reflecting mirror 12, when it is necessary to change the lamp unit integrally formed by the light source 11 and the condensing and reflecting mirror 12, by using the first MLA 131 of the old lamp unit in the new lamp unit, same lamp unit can be used in projectors having different shapes of the first MLA 131.

Second Embodiment

Figure 8:
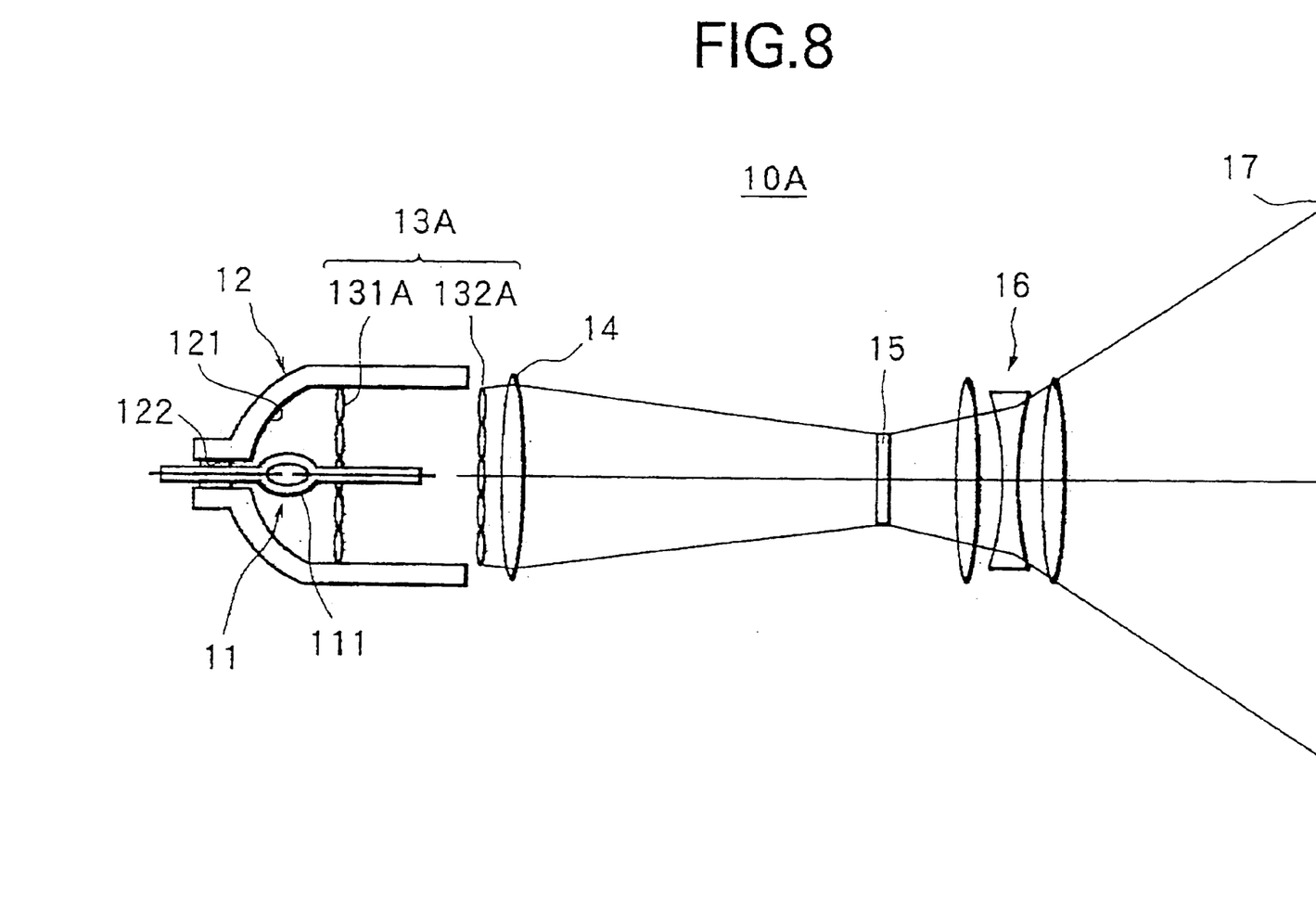
FIG. 8 is a view of the configuration of a second embodiment of a projection display apparatus (projector) using an optical apparatus according to the present invention.

FIG. 8 is a view of the configuration of a second embodiment of a projection type display apparatus (projector) using an optical apparatus according to the present invention.

The second embodiment is different from the first embodiment described above in the point that instead arranging the first MLA of the integrator optical system at the light emitting part 123 of the reflecting and condensing mirror 12, it is arranged inside the reflecting and condensing mirror 12, namely, at the emitting part of the light source 11 near the effective reflecting part of the reflecting and condensing mirror 12, that is, the reflecting surface 121 forming the parabolic shape.

In addition, in the second embodiment, the second MLA 132 of the integrator optical system is arranged near the light emitting part 123 of the reflecting and condensing mirror 12.

Figure 9A:
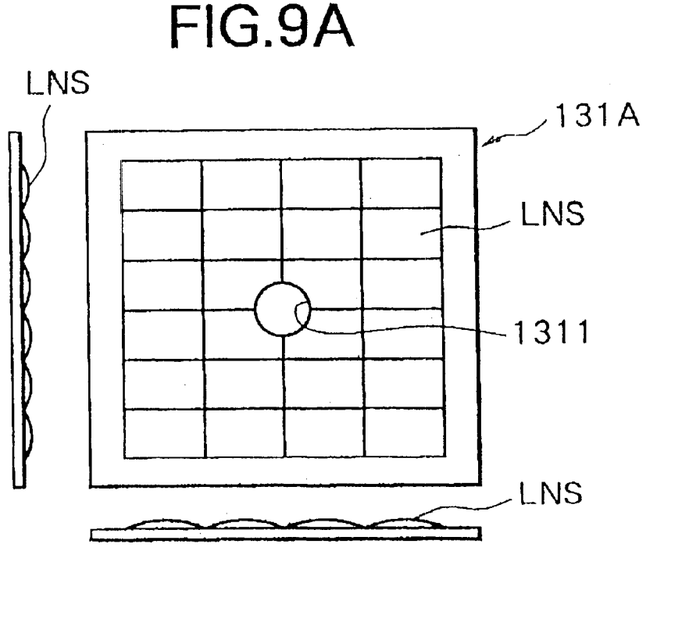
FIGS. 9A and 9B are views for explaining the configuration of a first MLA according to the second embodiment.
Figure 9B:
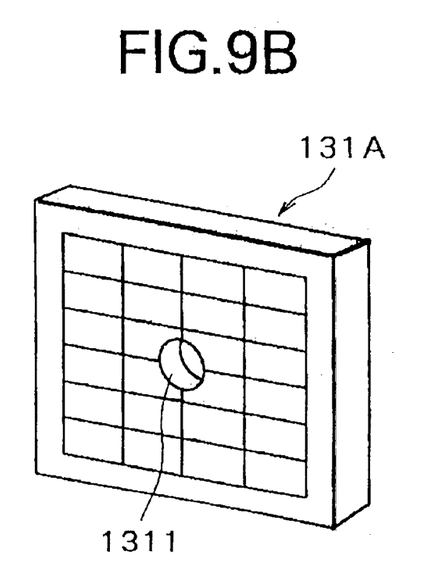

For this, the first MLA 131A of the integrator optical system 13A, as shown in FIGS. 9A and 9B, is formed at its center with a hole (an aperture) 1311 having a diameter allowing the axial part of the discharge lamp to pass through. The discharge lamp is formed to be inserted through this hole 1311.

In this case, the light emitted from the emitting part of the discharge lamp is reflected by the reflecting surface 121 of the reflecting and condensing mirror 12 and is emitted in the direction of the optical axis of the light source 11.

To emit substantially parallel light from the reflecting and condensing mirror 12, the reflecting mirror has to be a parabolic body of rotation. The emitting part 111 is placed near the focal position of the parabolic surface (reflecting surface) 121.

At this time, when the cross sectional area of the reflecting and condensing mirror 12 is small, the effective reflecting area of the inner reflecting surface 121 of the reflecting and condensing mirror 12 is small.

Figure 10:
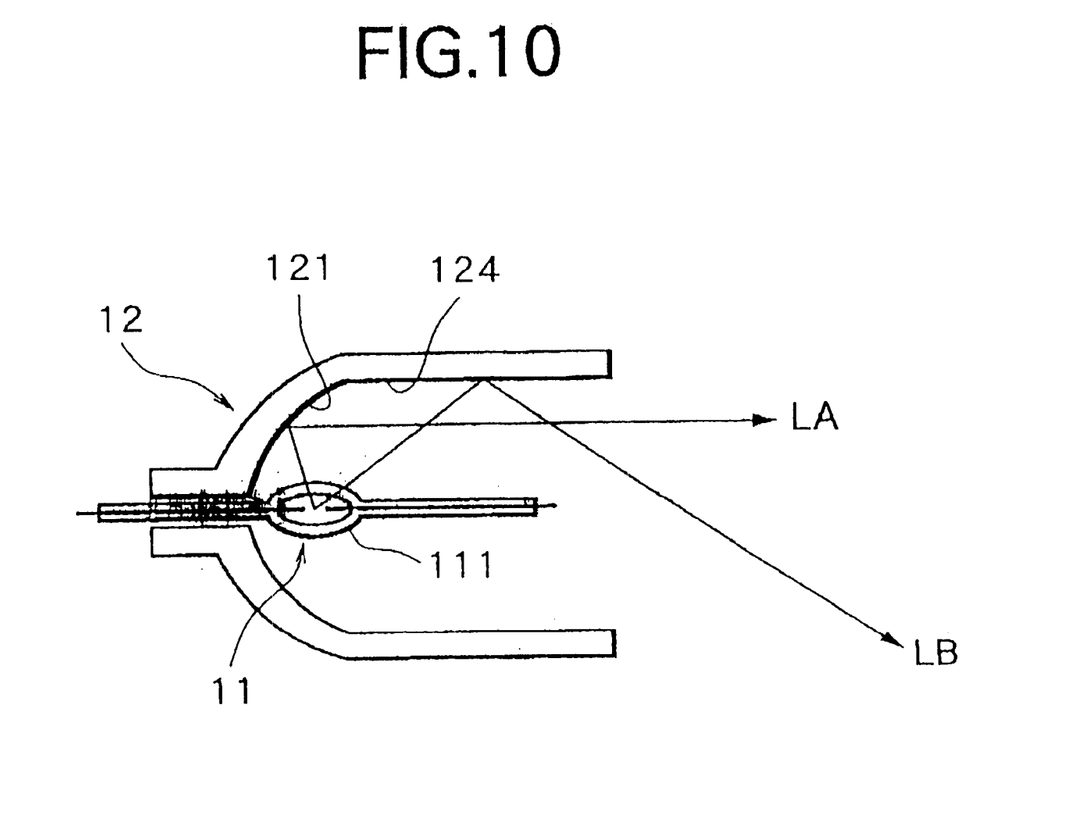
FIG. 10 is a schematic sectional view of a reflecting and condensing mirror in the case where the cross sectional area is small.

FIG. 10 is a schematic sectional view of the reflecting and condensing mirror when its cross sectional area is small.

In FIG. 10, LA denotes light reflected by the effective region (parabolic reflector), while LB denotes light reflected by the ineffective region.

When the cross section of the reflecting and condensing mirror 12 is small, the ineffective region 124 shown in FIG. 10 is not effective in condensing light. This is because the ineffective region is not parabolic, so even if the light from the light source is reflected by the ineffective region 124, it does not become substantially parallel light. Therefore, even if this light is incident on the first MLA 131A, it is not incident on the SLM 15.

As shown in FIG. 8, even if the first MLA 131A is incorporated at the SLM 15 side from the parabolic surface 121 of the reflecting and condensing mirror 12, an optical system can be formed without the light needed for illumination being obstructed.

This is because even in the case of an apparatus of the related art, the light incident on the first MLA 131A from the discharge lamp does not become effective illumination light.

The effective light from the discharge lamp is reflected by the parabolic reflector 121 of the reflecting and condensing mirror 12 to become substantially parallel light which is incident on the first MLA 131A.

The functions of the rest of the parts are the same as in the first embodiment, therefore, here, the explanations thereof are omitted.

According to the second embodiment of the present invention, being closer to the inside of the condensing and reflecting part, the optical path length is further shortened.

Due to this, there is the advantage of being able to contribute to reduction of the size of a projector.

Third Embodiment

Figure 11:
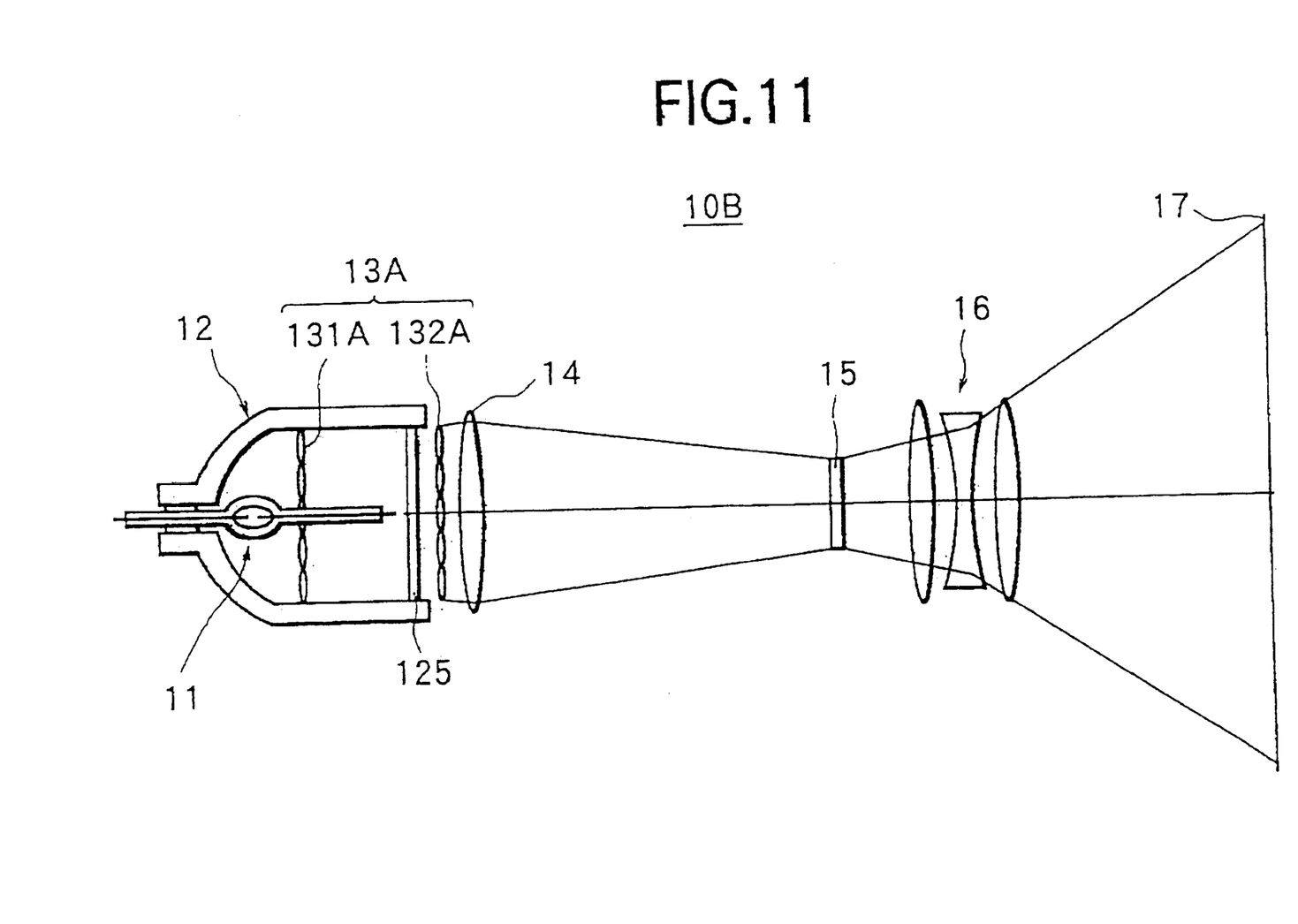
FIG. 11 is a view of the configuration of a third embodiment of a projection display apparatus (projector) using an optical apparatus according to the present invention.

FIG. 11 is a view of the configuration of a third embodiment of a projection display apparatus (projector) using an optical apparatus according to the present invention.

The third embodiment is different from the second embodiment described above in the point that a surface plate 125 passing light is provided separately at the light emitting part 123 of the reflecting and condensing mirror 12 from the view point of safety when the discharge lamp is broken.

The rest of the configuration and functions thereof are the same as with the second embodiment.

According to the third embodiment of the present invention, in addition to the effects of the second embodiment described above, there is an advantage of enhanced safety.

Fourth Embodiment

Figure 12:
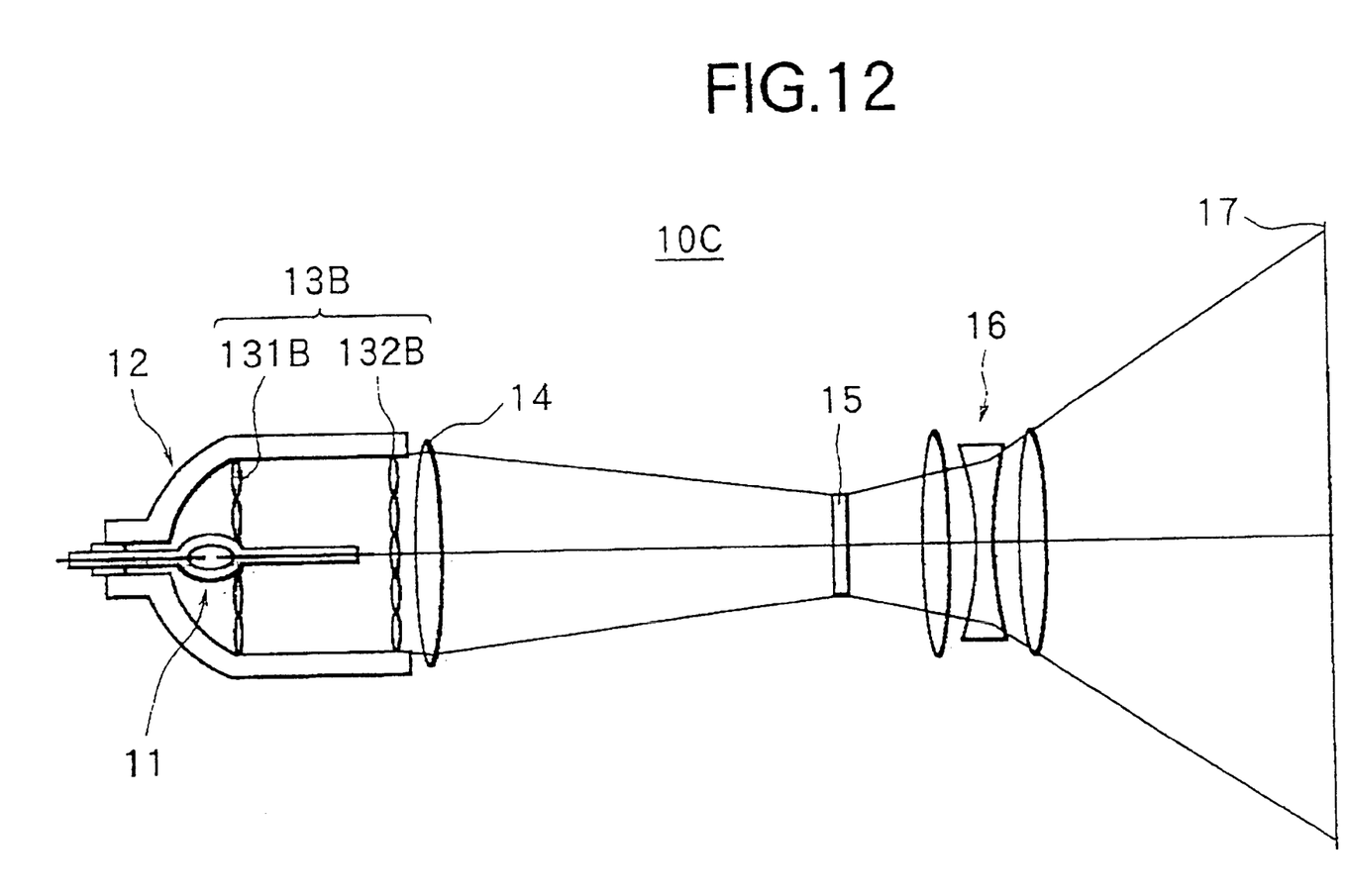
FIG. 12 is a view of the configuration of a fourth embodiment of a projection display apparatus (projector) using an optical apparatus according to the present invention.

FIG. 12 is a view of the configuration of a fourth embodiment of a projection display apparatus (projector) using an optical apparatus according to the present invention.

The fourth embodiment is different from the third embodiment described above in the point that the second MLA 132B is arranged integrally at the light emitting part 13 of the reflecting and condensing mirror 12 in place of the surface plate 125.

In this case, it is necessary for the light emitting part 123 to be positioned near the focal distance of the first MLA 131B of the integrator optical system 13B.

In the example in FIG. 12, the first MLA 131B is brought closer to the reflecting surface 121 of the reflecting and condensing mirror 12 than in the second and third embodiments.

According to the fourth embodiment of the present invention, an optical system in a projector further reduced in size can be realized and reduction of the total size, weight, and material of an apparatus is achievable. Furthermore, as the number of the optical elements through which the light passes is reduced, the light that illuminates the SLM 15 can be intensified, so there is the advantage that a projector of a high luminance can be realized.

Note that in the above embodiments, although a projector including one SLM was described, to which the present invention is applied, the present invention is not limited to this, it can also be widely applied to a multi-plate projector which separates the illuminating light by a color separating means such as a dichromic mirror, etc., modulates the light using a number of SLMs corresponding to the separated colors, combines the modulated light of different colors by a color combining means such as a dichromic prism, etc., and projects the light onto a screen by a projecting lens.

Summarizing the effects of the invention, as explained above, according to the present invention, for example, a small-sized optical system for illumination used in a projection display apparatus etc. can be realized. As a result, it is possible to reduce the size and lighten the weight of the projection display apparatus using the optical apparatus and reduce the materials. Further, as the number of the optical elements through which the light passes is reduced, the light incident on a modulating means can be intensified, so there is the advantage that a projection display apparatus having a high luminance can be realized.

While the invention has been described with reference to specific embodiment chosen for purpose of illustration, it should be apparent that numerous modifications could be made thereto by those skilled in the art without departing from the basic concept and scope of the invention.

What is claimed is:

1. An optical apparatus, comprising:

a light source, a reflecting and condensing mirror for reflecting and condensing a light beam from the light source, guiding the light beam to substantially the same direction, and emitting the light beam from a light emitting part, a first multi-lens array in which a plurality of lens are arranged, and which divides an incident light into a plurality of images, and lays out the light spots of the divided images at predetermined locations, and a second multi-lens array in which a plurality of lens corresponding to the plurality of light spots condensed by the first multi-lens array are arranged and which is arranged in the proximity of the focal distance of the first multi-lens array, wherein
the first multi-lens array is positioned integral with the light emitting part of the reflecting and condensing mirror so that the light reflected and condensed by the reflecting and condensing mirror is incident as said incident light.

2. An optical apparatus, comprising:

a light source, a reflecting and condensing mirror for reflecting and condensing a light beam from the light source, guiding the light beam to substantially the same direction, and emitting the light beam from a light emitting part, a first multi-lens array in which a plurality of lens are arranged, and which divides an incident light into a plurality of images, and lays out the light spots of the divided images at predetermined locations, and a second multi-lens array in which a plurality of lens corresponding to the plurality of light spots condensed by the first multi-lens array are arranged and which is arranged in the proximity of the focal distance of the first multi-lens array, wherein
the first multi-lens array is positioned within the light emitting part so that the light reflected and condensed by the reflecting and condensing mirror is incident as said incident light.

3. An optical apparatus as set forth in claim 2, wherein an aperture is formed in approximately the center portion of said first multi-lens array, and said light source is inserted into the aperture.

4. An optical apparatus as set forth in claim 2, wherein a transparent plate passing the light emitted from said first multi-lens array is arranged at the light emitting part of said reflecting and condensing mirror.

5. An optical apparatus as set forth in claim 3, wherein a transparent plate passing the light emitted from said first multi-lens array is arranged at the light emitting part of said reflecting and condensing mirror.

6. An optical apparatus as set forth in claim 2, wherein said second multi-lens array is arranged integrally at the light emitting part of said reflecting and condensing mirror.

7. An optical apparatus as set forth in claim 3, wherein said second multi-lens array is arranged integrally at the light emitting part of said reflecting and condensing mirror.

8. A projection type display apparatus comprising a modulating means for modulating and emitting a light emitted from an optical apparatus based on image information and a projection optical system for projecting the light emitted from the modulating means on a screen, the optical apparatus comprising at least
a light source,
a reflecting and condensing mirror for reflecting and condensing a light beam from the light source, guiding the light beam to substantially the same direction, and emitting the light beam from a light emitting part,
a first multi-lens array in which a plurality of lens are arranged, and which divides an incident light into a plurality of images, and lays out the light spots of the divided images at predetermined locations, and
a second multi-lens array in which a plurality of lens corresponding to the plurality of light spots condensed by the first multi-lens array are arranged and which is arranged in the proximity of the focal distance of the first multi-lens array, wherein
the first multi-lens array is positioned integral with the light emitting part of the reflecting and condensing mirror so that the light reflected and condensed by the reflecting and condensing mirror is incident as said incident light.

9. A projection type display apparatus comprising a modulating means for modulating and emitting a light emitted from an optical apparatus based on image information and a projection optical system for projecting the light emitted from the modulating means on a screen, the optical apparatus comprising at least
a light source,
a reflecting and condensing mirror for reflecting and condensing a light beam from the light source, guiding the light beam to substantially the same direction, and emitting the light beam from a light emitting part,
a first multi-lens array in which a plurality of lens are arranged, and which divides an incident light into a plurality of images, and lays out the light spots of the divided images at predetermined locations, and
a second multi-lens array in which a plurality of lens corresponding to the plurality of light spots condensed by the first multi-lens array are arranged and which is arranged in the proximity of the focal distance of the first multi-lens array, wherein
the first multi-lens array is positioned within the light emitting part so that the light reflected and condensed by the reflecting and condensing mirror is incident as said incident light.

10. A projection type display apparatus as set forth in claim 9, wherein an aperture is formed in approximately the center portion of said first multi-lens array, and said light source is inserted into the aperture.

11. A projection type display apparatus as set forth in claim 9, wherein a transparent plate passing the light emitted from said first multi-lens array is arranged at the light emitting part of said reflecting and condensing mirror.

12. A projection type display apparatus as set forth in claim 10, wherein a transparent plate passing the light emitted from said first multi-lens array is arranged at the light emitting part of said reflecting and condensing mirror.

13. A projection type display apparatus as set forth in claim 9, wherein said second multi-lens array is arranged integrally at the light emitting part of said reflecting and condensing mirror.

14. A projection type display apparatus as set forth in claim 10, wherein said second multi-lens array is arranged integrally at the light emitting part of said reflecting and condensing mirror.

* * * * *